(12) United States Patent
Chino

(10) Patent No.: US 12,387,327 B2
(45) Date of Patent: Aug. 12, 2025

(54) MEDICAL IMAGE PROCESSING APPARATUS, MEDICAL IMAGE PROCESSING METHOD, AND RECORDING MEDIUM

(71) Applicant: ZIOSOFT, INC., Tokyo (JP)

(72) Inventor: Shusuke Chino, Tokyo (JP)

(73) Assignee: ZIOSOFT, INC., Tokyo (JP)

( * ) Notice: Subject to any disclaimer, the term of this patent is extended or adjusted under 35 U.S.C. 154(b) by 370 days.

(21) Appl. No.: 18/188,558

(22) Filed: Mar. 23, 2023

(65) Prior Publication Data

US 2023/0326019 A1 Oct. 12, 2023

(30) Foreign Application Priority Data

Mar. 30, 2022 (JP) ................. 2022-056314

(51) Int. Cl.
*A61K 35/12* (2015.01)
*G06K 9/00* (2022.01)
(Continued)

(52) U.S. Cl.
CPC .............. *G06T 7/0012* (2013.01); *G06T 7/70* (2017.01); *G06T 2207/30056* (2013.01); *G06T 2207/30101* (2013.01)

(58) Field of Classification Search
CPC .............. A61K 35/12; G06K 9/00; G06T 7/00
USPC ........ 382/100, 103, 106–107, 128–133, 155, 382/168, 173, 181, 199, 214, 219, 224, 382/254, 276, 286–291, 305; 715/788; 378/4, 21
See application file for complete search history.

(56) References Cited

U.S. PATENT DOCUMENTS 10,249,074 B2 4/2019 Suzuki
11,037,672 B2 6/2021 Nagata
(Continued)

FOREIGN PATENT DOCUMENTS

JP 4188900 B2 12/2008
JP 2016-202319 A 12/2016
(Continued)

OTHER PUBLICATIONS

Endoscopic Transgastric Abdominal Exploration and Organ Resection: Initial Experience in a Porcine Model Mihir S. Wagh, Benjamin F. Merrifield, and Christopher C. Thompson Division of Gastroenterology, Brigham and Women's Hospital and Harvard Medical School, Boston, Massachusetts (Year: 2005).*

*Primary Examiner* — Seyed H Azarian
(74) *Attorney, Agent, or Firm* — McDonald Hopkins LLC

(57) ABSTRACT

A medical image processing apparatus includes a processor and configured to visualize an organ. The processor is configured to: acquire volume data including the organ; designate a tubular tissue included in the organ; designate a first resection region including the tubular tissue, the first resection region being a resection target region in the organ; derive, based on the designated first resection region, a first cutting position at which the tubular tissue is cut; derive, based on the tubular tissue and the first cutting position, a first failure region included in the organ, the first failure region being predicted to cause a tissue to be dysfunctional due to stagnation of circulation in the tubular tissue to be cut; and cause a display to display the organ, the first resection region, and the first failure region.

9 Claims, 13 Drawing Sheets

(51) Int. Cl.
   *G06T 7/00*      (2017.01)
   *G06T 7/70*      (2017.01)

(56) References Cited

U.S. PATENT DOCUMENTS

| | | | |
|---|---|---|---|
| 2006/0103670 A1 | 5/2006 | Matsumoto | |
| 2010/0007663 A1* | 1/2010 | Matsumoto | A61B 6/463 |
| | | | 715/788 |
| 2016/0303073 A1* | 10/2016 | Takeuchi | A61L 31/16 |
| 2017/0049469 A1* | 2/2017 | Zu | A61B 6/503 |
| 2017/0301129 A1 | 10/2017 | Seo et al. | |
| 2019/0183986 A1* | 6/2019 | Sanders | A61K 9/0014 |
| 2020/0242776 A1 | 7/2020 | Nagata et al. | |
| 2020/0243184 A1* | 7/2020 | Nagata | G06T 15/06 |
| 2022/0110954 A1* | 4/2022 | Jennings | A61K 31/357 |

FOREIGN PATENT DOCUMENTS

| | | |
|---|---|---|
| JP | 2017-189460 A | 10/2017 |
| JP | 2018-121857 A | 8/2018 |
| JP | 2020-120827 A | 8/2020 |
| JP | 2020-120828 A | 8/2020 |

\* cited by examiner

MEDICAL IMAGE PROCESSING APPARATUS, MEDICAL IMAGE PROCESSING METHOD, AND RECORDING MEDIUM

CROSS-REFERENCE TO RELATED APPLICATIONS

This application is based on and claims priority under 35 USC 119 from Japanese Patent Application No. 2022-056314 filed on Mar. 30, 2022, the contents of which are incorporated herein by reference.

TECHNICAL FIELD

The present disclosure relates to a medical image processing apparatus, a medical image processing method, and a recording medium.

BACKGROUND ART

The related art discloses to ligate and resect a tubular tissue including a blood vessel at the time of resecting an organ. The related art discloses a medical image processing apparatus configured to highlight a location of ligation and resection (refer to Patent Literature 1: U.S. Pat. No. 11,037,672).

The disclosure of Patent Literature 1 enables the cutting plane of a blood vessel to be visualized, but there's not consideration for partial resection of an organ including the blood vessel. In addition, it is not fully assumed that a tissue does not function due to stagnation of a blood stream due to cutting of the blood vessel.

When a region that lose function is large, burden on the patient will increase.

SUMMARY

The present disclosure relates to a medical image processing apparatus, a medical image processing method, a recording medium capable of visualizing a failure region due to partial resection of an organ.

A first aspect of the present disclosure relates to a medical image processing apparatus includes a processor and configured to visualize an organ. The processor is configured to: acquire volume data including the organ; designate a tubular tissue included in the organ; designate a first resection region including the tubular tissue, the first resection region being a resection target region in the organ; derive, based on the designated first resection region, a first cutting position at which the tubular tissue is cut; derive, based on the tubular tissue and the first cutting position, a first failure region included in the organ, the first failure region being predicted to cause a tissue to be dysfunctional due to stagnation of circulation in the tubular tissue to be cut; and cause a display to display the organ, the first resection region, and the first failure region.

A second aspect of the present disclosure relates to a medical image processing method for visualizing an organ, the medical image processing method including: acquiring volume data including the organ; designating a tubular tissue included in the organ; designating a first resection region including the tubular tissue, the first resection region being a resection target region in the organ; deriving, based on the designated first resection region, a first cutting position at which the tubular tissue is cut; deriving, based on the tubular tissue and the first cutting position, a first failure region included in the organ, the first failure region being predicted to cause the tissue to be dysfunctional due to stagnation of circulation in the tubular tissue to be cut; and displaying, by a display, the organ, the first resection region, and the first failure region.

A third aspect of the present disclosure relates to a non-transitory computer-readable recording medium storing a medical image processing program for causing a computer to execute the medical image processing method described above.

According to the present disclosure, a failure region due to partial resection of an organ can be visualized.

BRIEF DESCRIPTION OF DRAWINGS

Exemplary embodiment of the present invention will be described in detail based on the following figures, wherein.

DESCRIPTION OF EMBODIMENTS

Hereinafter, embodiments of the present disclosure will be described with reference to the drawings.

Embodiment

Figure 1:
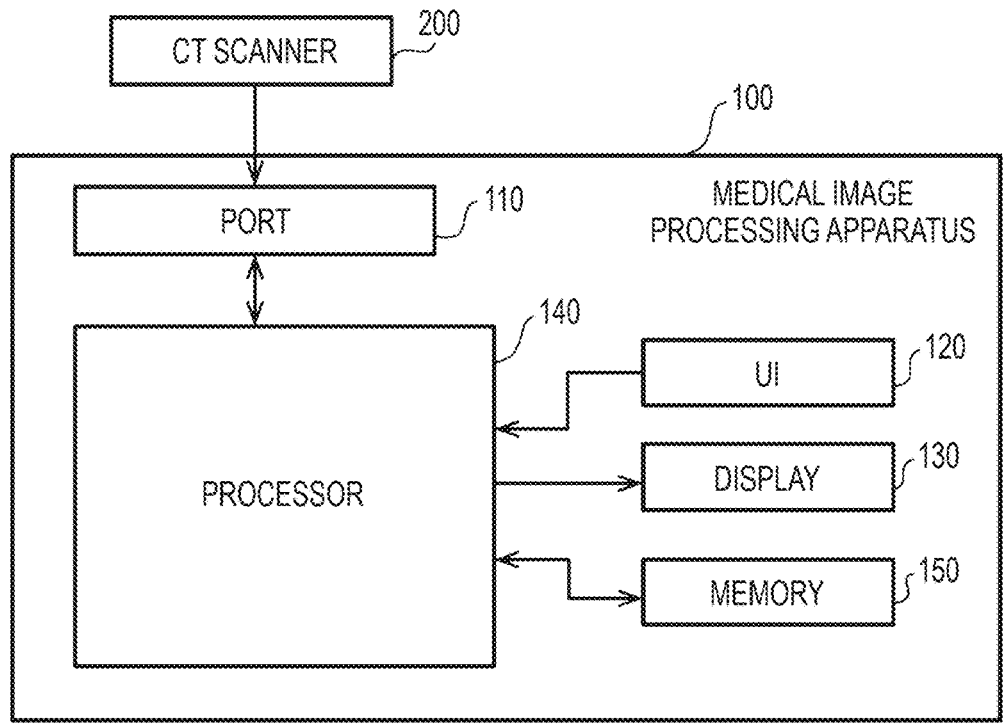
FIG. 1 is a block diagram showing a hardware configuration example of a medical image processing apparatus according to an embodiment.

FIG. 1 is a block diagram showing a configuration example of a medical image processing apparatus 100 according to a first embodiment. The medical image processing apparatus 100 includes a port 110, an UI 120, a display 130, a processor 140, and a memory 150.

A CT scanner 200 is connected to the medical image processing apparatus 100. The medical image processing apparatus 100 acquires volume data from the CT scanner 200 and processes the acquired volume data. The medical image processing apparatus 100 may be configured by a PC and software installed in the PC.

The CT scanner 200 irradiates a subject with X-rays and acquires an image (CT image) using a difference in absorption of the X-rays by tissues in the body. The subject may include a living body, a human body, an animal, or the like. The CT scanner 200 generates volume data including information on any location inside the subject. The CT scanner 200 transmits the volume data as the CT image to the medical image processing apparatus 100 via a wired line or wireless line. Imaging conditions related to CT imaging and contrast conditions related to administration of a contrast medium may be taken into consideration when the CT image is acquired. Contrast imaging may be performed on an artery, a portal vein, a vein, and the like of an organ. The contrast imaging may be performed a plurality of times at different timings depending on the characteristics of the organ.

The port 110 in the medical image processing apparatus 100 includes a communication port, an external device connection port, a connection port to an embedded device, or the like, and acquires volume data obtained from the CT image. The acquired volume data may be immediately transmitted to the processor 140 for various pieces of processing, or may be stored in the memory 150 and then transmitted to the processor 140 for various pieces of processing when necessary. Further, the volume data may be acquired via a recording device or a recording medium. The volume data may also be acquired in the form of intermediate data, compressed data, sinograms, or the like. The volume data may also be acquired from information from a sensor device attached to the medical image processing apparatus 100. The port 110 functions as an acquisition unit configured to acquire various pieces of data such as volume data.

The UI 120 may include a touch panel, a pointing device, a keyboard, or a microphone. The UI 120 receives any input operation from a user of the medical image processing apparatus 100. Examples of the user may include a physician, a radiologist, a student, or other paramedic staffs.

The UI 120 receive various operations. For example, the UI 120 receives operations such as designation of a region of interest (ROI) and setting of brightness conditions in volume data or an image based on the volume data (for example, three-dimensional image or two-dimensional image to be described later). The ROI may include regions of various tissues (for example, blood vessels, bronchi, organs, bones, and brain). The tissue may include a diseased tissue, a normal tissue, a tumor tissue, or the like.

The display 130 may include, for example, an LCD, and displays various pieces of information. The various pieces of information may include a three-dimensional image or a two-dimensional image obtained from the volume data. The three-dimensional image may include a volume rendering image, a surface rendering image, a virtual endoscopic image, a virtual ultrasound image, a CPR image, or the like. The volume rendering image may include a RaySum image, a maximum intensity projection (MIP) image, a minimum intensity projection (MinIP) image, a mean value image, a raycast image, or the like. The two-dimensional image may include an axial image, a sagittal image, a coronal image, an MPR image, or the like.

The memory 150 includes primary storage devices such as various ROMs and RAMs. The memory 150 may include a secondary storage device such as an HDD or an SSD. The memory 150 may include a tertiary storage device such as a USB memory or an SD card. The memory 150 stores various pieces of information and programs. The various pieces of information may include volume data acquired by the port 110, an image generated by the processor 140, setting information set by the processor 140, and various programs. The memory 150 is an example of a non-transient recording medium in which programs are recorded.

The processor 140 may include a CPU, a DSP, or a GPU. The processor 140 functions as a processing unit 160 configured to perform various pieces of processing and control by executing a medical image processing program stored in the memory 150.

Figure 2:
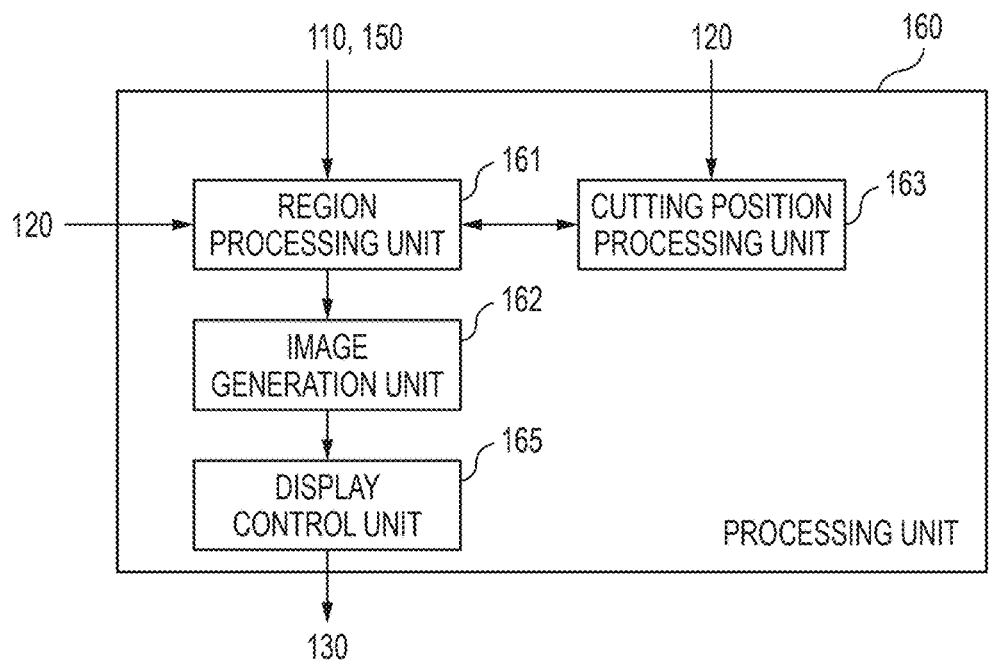
FIG. 2 is a block diagram showing a functional configuration example of the medical image processing apparatus.

FIG. 2 is a block diagram showing a functional configuration example of the processing unit 160.

The processing unit 160 includes a region processing unit 161, an image generation unit 162, a cutting position processing unit 163, and a display control unit 165. The processing unit 160 controls each unit of the medical image processing apparatus 100. The processing unit 160 performs processing related to visualization of an organ and a tissue. Note that respective units included in the processing unit 160 may be implemented as different functions by one hardware, or may be implemented as different functions by a plurality of pieces of hardware. Further, the respective units included in the processing unit 160 may be implemented by a dedicated hardware component.

The region processing unit 161 acquires volume data of a subject via, for example, the port 110. The region processing unit 161 extracts any region included in the volume data. The region processing unit 161 may automatically designate the ROI and extract the ROI, for example, based on a voxel value of the volume data. The region processing unit 161 may manually designate the ROI via, for example, the UI 120 and extract the ROI. The ROI may include regions such as the liver, lungs, bronchi, pulmonary arteries, pulmonary veins, portal veins, hepatic veins, and the like. The ROI may be at least a part of the organ to be resected from the subject. Additionally, the ROI may be at least a part of the tubular tissues (for example, blood vessels (for example, portal veins, arteries, and veins), bronchi, and bile ducts). The region processing unit 161 may generate a tree indicating the running state of the tubular tissue based on the region of the tubular tissue.

The region processing unit 161 may divide the organ of the subject into segments. The segments may at least roughly correspond to anatomical segments. The organ may include liver, kidneys, lungs, and other organs. The segment may be at least a partial region of a combination of a plurality of segments. The segment may be a unit of a subsegment. In division of the segment, Voronoi tessellation may be performed. For example, Voronoi tessellation using a portal vein or an artery as a seed may be performed to derive each segment of the organ.

The region processing unit 161 may determine a territory of the portal vein or the like based on the running state (portal vein tree or the like) of the portal vein or the artery (also referred to as portal vein or the like), which is one of the tubular tissues. The territory of the portal vein or the like refers to a region where the portal vein or the artery that nourishes (carries nutrients to) a tumor is nourished. The portal vein or the like that nourishes the tumor is also called a responsible blood vessel. For example, the region processing unit 161 may calculate the territory of the portal vein or the like by performing Voronoi tessellation using the portal vein or the artery as a seed.

The region processing unit 161 may determine the territory of the vein based on the running state (vein tree) of the vein, which is one of the tubular tissues. The territory of the vein is a perfusion region where the vein is perfused. The region processing unit 161 may calculate the perfusion region of the vein, for example, by performing Voronoi tessellation using the vein as a seed. The perfusion region of the vein may or may not overlap with the territory of the portal vein or the like.

The region processing unit 161 may calculate a necrosis region based on the territory of the portal vein or the like and the territory of the vein (perfusion region). The necrosis region is a region where a tissue is predicted to become necrotic due to the cut vein and stagnation of a blood stream in addition to a region where arteries or portal veins are permanently blocked. The necrosis region is one of the affected regions affected by cutting a tubular tissue. The necrosis region is, for example, a region obtained by integrating a territory of a portal vein or the like where the blood stream is stagnant due to the cut of the portal vein or the like and a perfusion region where the blood stream is stagnant due to the cut of the vein. Thus, the necrosis region includes a territory positioned downstream in the blood stream from the cutting position of the portal vein or the like, or the vein. The stagnation of the blood stream is an example of stagnation of blood circulation in the tubular tissue to be cut.

In Voronoi tessellation, the region processing unit 161 may divide the organ into a plurality of segments or calculate the territory and the perfusion region based on a reference line or a distance from a point on the reference line. The reference line may be a line representing the running of the tubular tissue such as blood vessels and bronchi. For example, the region processing unit 161 may divide the segment of the organ or determine the territory and the perfusion region based on an extracted tree T1 (for example, tree of portal veins, arteries, or bronchi) that is likely to run through the center of the segment of the organ. The region processing unit 161 may modify the segment and the territory as a result of this segment division based on a tree T2 (for example, tree of veins or lymphatic vessels) that is likely to run through an end of the segment or the territory or through a boundary. Further, the region processing unit 161 may divide the organ into segments and determine the territory based on the extracted tree T1 and tree T2. An example of the segment division is disclosed in Reference Patent Literature 1 (Reference Patent Literature 1: US Patent Application Publication No. 2020/0242776). Reference Patent Literature 1 is incorporated herein by reference in its entirety.

The region processing unit 161 may derive a resection region, which is a region to be resected in an organ. The resection region is, for example, a region including a tumor, the tumor portion of which is resected from the organ. The resection region may be the same as or different from the determined territory. The resection region may be the same as or different from the divided segment including the tumor. The region processing unit 161 may manually designate the resection region via the UI 120, or may automatically designate the resection region according to a predetermined algorithm. The resection region may be a region of an organ to be resected by partial resection surgery or the like.

For example, the region processing unit 161 designates, via the UI 120, a center point at which resection on the surface of the organ is started and a diameter of the resection range, thereby generating a primitive shape (for example, conical trapezoidal shape) including the tumor over a whole of the resection region. Further, when designating one or more points (control points) on the surface of the organ, the region processing unit 161 may derive a resection region by using a line connecting one or more designated control points as an outer peripheral line of the resection region. In other words, the resection region can be derived only by giving a simple instruction from a user (instruction to designate control point) so as to make an approach from this side of the organ via the UI 120.

The region processing unit 161 may generate a curved surface using any point in the organ, for example, using a point on the tubular tissue running through the inside of the organ as a resection surface. The resection region may be independent of any of the above-described segment of the organ, the territory of the portal vein, or the perfusion region of the vein.

The region processing unit 161 may modify (re-derive) the resection region that is already derived. For example, the region processing unit 161 may manually modify the resection region via the UI 120. The region processing unit 161 may automatically modify the resection region based on the derived necrosis region. For example, the region processing unit 161 may modify the resection region so that a predetermined (for example, critical) portal vein or vein is not included in the resection region. For example, modification may be performed so as to expand the resection region without expanding the necrosis region.

The image generation unit 162 generates various images. The image generation unit 162 generates a three-dimensional image or a two-dimensional image based on at least a part of the acquired volume data (for example, volume data of extracted region or segment). The image generation unit 162 may generate an image in which a part of the organ included in the resection region is excluded. In this case, although the resection region in the organ is excluded, an image in which at least a part of the tubular tissue in the resection region remains may be generated, or an image in which at least a part of the tubular tissue in the resection region is also excluded may be generated.

The image generation unit 162 may generate an image by performing various types of rendering (for example, volume rendering or surface rendering). The image generation unit 162 may generate an image using a mask. When the mask is used, only the voxels in the masked region are drawn in the image, and the voxels in the non-masked region are not drawn in the image. Further, a plurality of masks can be used for respective regions. Image generation using a mask is disclosed in Reference Patent Literature 2 (Reference Patent Literature 2: US Patent Application Publication No. 2006/0103670). Note that the image generation unit 162 may generate an image without using a mask. Reference Patent Literature 2 is incorporated herein by reference in its entirety.

The cutting position processing unit 163 determines a position (cutting position, cutting point) where a tubular tissue (for example, portal vein, artery, or vein) is cut. The cutting position processing unit 163 may manually determine the cutting position of the tubular tissue via the UI 120. The cutting position processing unit 163 may calculate the cutting position of the tubular tissue running through the neighbor of the organ or the inside thereof based on the resection region of the organ. The cutting position of the tubular tissue is synonymous with the cutting position on the tree of the tubular tissue.

The tubular tissue to be cut may be a tubular tissue to be ligated and resected. The ligation and resection may be performed in conjunction with tumor removal of the organ, segment resection of the organ, wedge resection of the organ, and the like.

The display control unit 165 causes the display 130 to display various pieces of data and information, or an image. The image includes an image generated by the image generation unit 162. The display control unit 165 may display a resection region, a territory, a perfusion region, a necrosis region, and the like. In this case, at least one of the resection region, the territory, the perfusion region, the necrosis region, or the like may be displayed in a different display mode. Further, the display control unit 165 may superimpose information (emphasis information) that emphasizes the cutting position on the rendering image. The emphasis information may include contour emphasis information that emphasizes the outline of the cutting position, or plane emphasis information that emphasizes the cutting plane.

Figure 3:
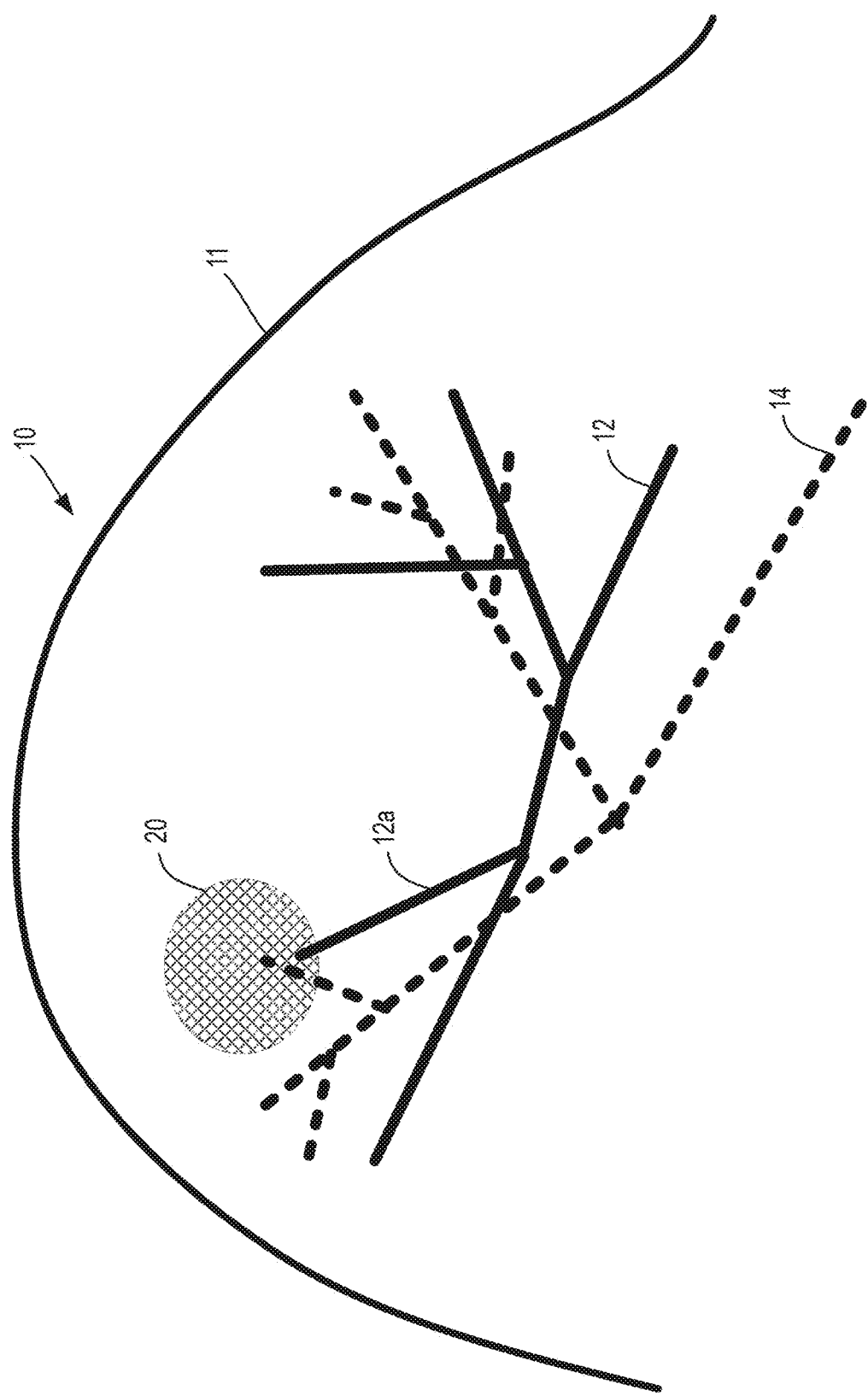
FIG. 3 is a diagram showing an example of an inside of the subject's body.

FIG. 3 is a diagram showing an example of an inside of the subject's body. FIG. 3 shows a liver 10, a tumor 20, a portal vein 12, and a vein 14 as the inside of the subject's body. The portal vein 12 and the vein 14 exist inside a surface 11 of the liver 10. A part of the portal vein 12 serves as a responsible blood vessel 12a and nourishes the tumor 20. In FIG. 3, the portal vein 12 is indicated by a solid line and the vein 14 is indicated by a dotted line (broken line) for description. The same also applies to subsequent drawings.

Figure 4:
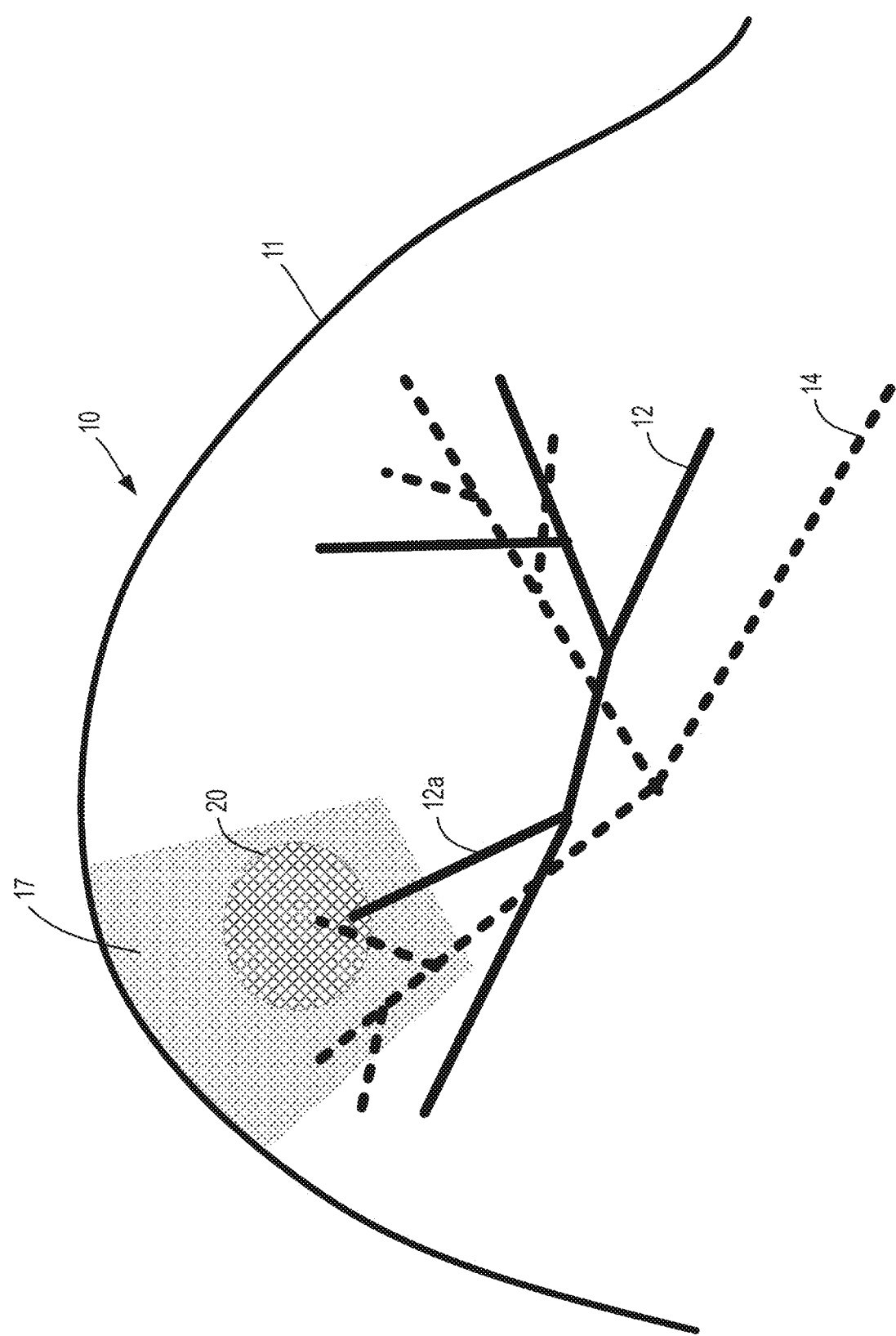
FIG. 4 is a diagram showing an example of a resection region in the liver.

FIG. 4 is a diagram showing an example of a resection region 17 in the liver 10. The region processing unit 161 determines, based on the portal vein 12 including the responsible blood vessel 12a, a territory of a portal vein, which is a region nourished by the responsible blood vessel 12a, by Voronoi tessellation or the like. The region processing unit 161 may determine the territory of the portal vein or the like by Voronoi tessellation or the like based on the portal vein 12 including the responsible blood vessel 12a and the vein 14. In FIG. 4, an outer periphery of the territory of the portal vein or the like may be formed by setting the distances from the plurality of portal veins 12 located close to each other to be approximately equal. Further, the outer periphery of the territory may be formed along the running of the vein 14. The region processing unit 161 designates the resection region 17 including the tumor 20 manually or automatically. In FIG. 4, veins are included in a vicinity of a boundary of the resection region 17. For example, the region processing unit 161 may designate conical trapezoidal resection region 17 via the UI 120.

Figure 5:
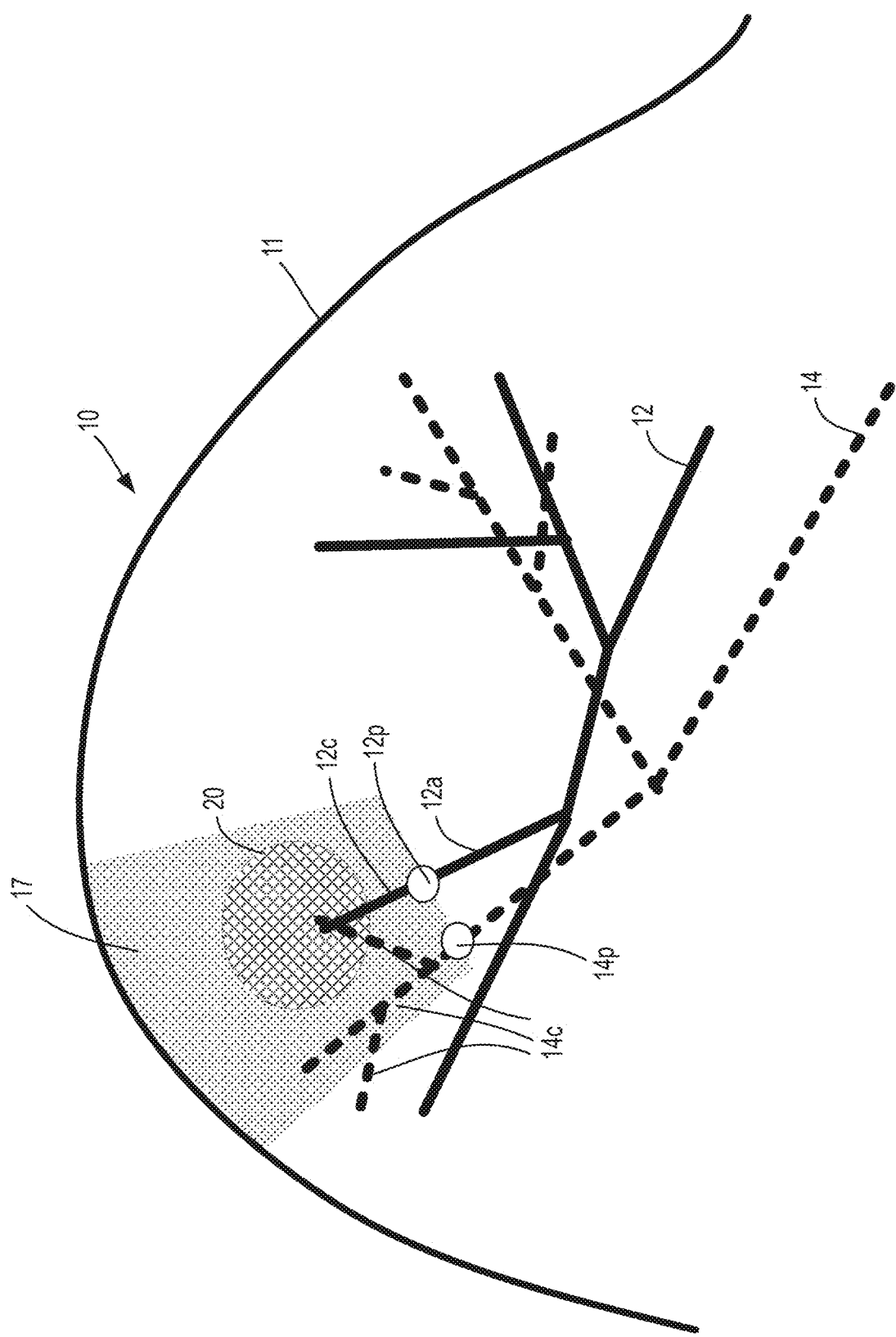
FIG. 5 is a diagram showing an example of a cutting position of a portal vein and a vein based on the resection region in the liver.

FIG. 5 is a diagram showing an example of cutting positions 12p and 14p of the portal vein 12 and the vein 14 based on the resection region 17 in the liver 10. The cutting position 12p is a position where the portal vein 12 (responsible blood vessel 12a) is cut. The cutting position 14p is a position where the vein 14 is cut. The cutting positions 12p and 14p are indicated by, for example, a two-dimensional cutting plane. The cutting position 12p may be the intersection of the portal vein 12 (responsible blood vessel 12a) and an outer peripheral surface of the resection region 17. The cutting location 14p may be the intersection of the vein 14 and the outer peripheral surface of the resection region 17.

Figure 6:
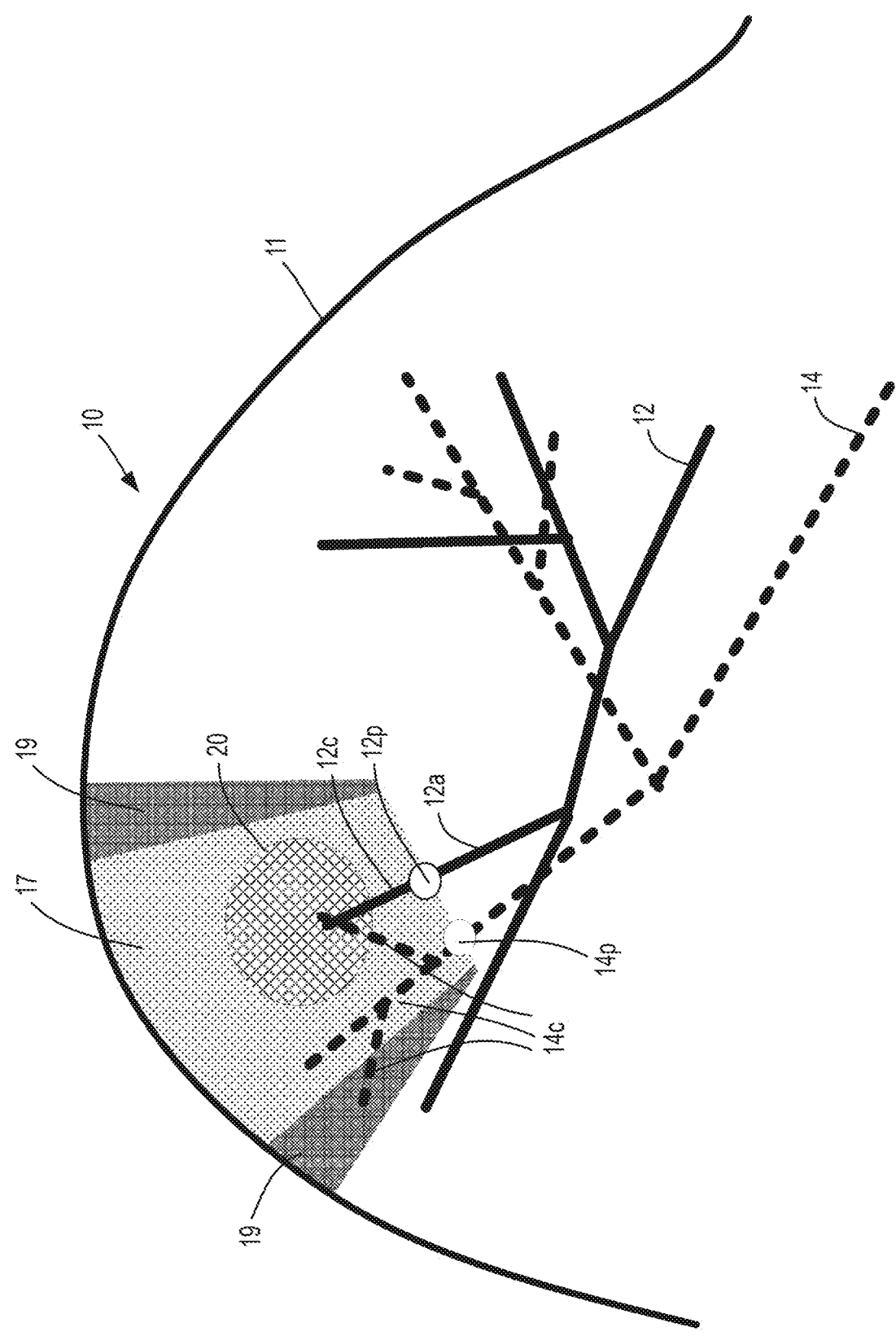
FIG. 6 is a diagram showing an example of a necrosis region based on the cutting position of the portal vein and the vein in the liver.

FIG. 6 is a diagram showing an example of a necrosis region 19 based on the cutting positions 12p and 14p of the portal vein 12 and the vein 14 in the liver 10. The necrosis region 19 is a region including the territory of the portal vein 12 downstream of the cutting position 12p and the perfusion region of the vein 14 downstream of the cutting position 14p. The region processing unit 161 determines the necrosis region 19 in which perfusion is cut off by the resection region 17 and necrosis occurs by Voronoi tessellation or the like based on the portal vein 12 including the responsible blood vessel 12a and the cutting position 12p of the portal vein 12. The region processing unit 161 may determine the necrosis region 19 in which perfusion is cut off by the resection region 17 and necrosis occurs by Voronoi tessellation or the like based on the portal vein 12 including the responsible blood vessel 12a, the cutting position 12p of the portal vein 12, the vein 14, and the cutting position 14p of the vein 14. Further, the periphery of the necrosis region 19 may be formed along the running of the vein 14 and the cutting position 14p. FIG. 6 shows a portal vein removal portion 12c removed by cutting the portal vein 12 at the cutting position 12p and a vein removal portion 14c removed by cutting the vein 14 at the cutting position 14p. The portal vein removal portion 12c and the vein removal portion 14c are included in the necrosis region 19. The necrosis region 19 includes the resection region 17.

Figure 7:
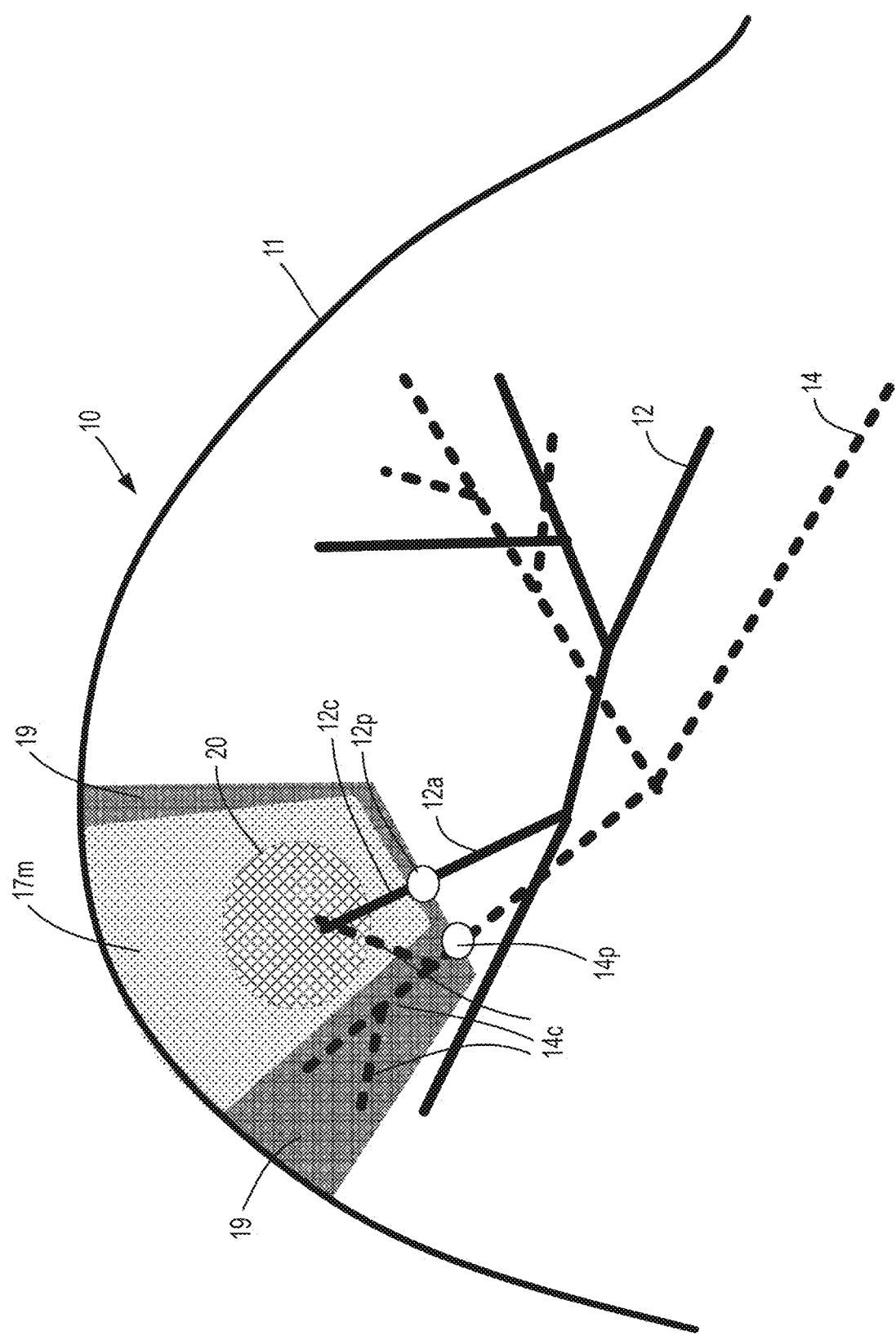
FIG. 7 is a diagram showing an example of a modified resection region in the liver.

FIG. 7 is a diagram showing an example of a modified resection region in the liver 10. The region processing unit 161 modifies the resection region 17 to generate a modified resection region 17m. In the modified resection region 17m, the vein 14 running along the vicinity of the boundary of the resection region 17 is modified so as to be outside the modified resection region 17m.

Figure 8:
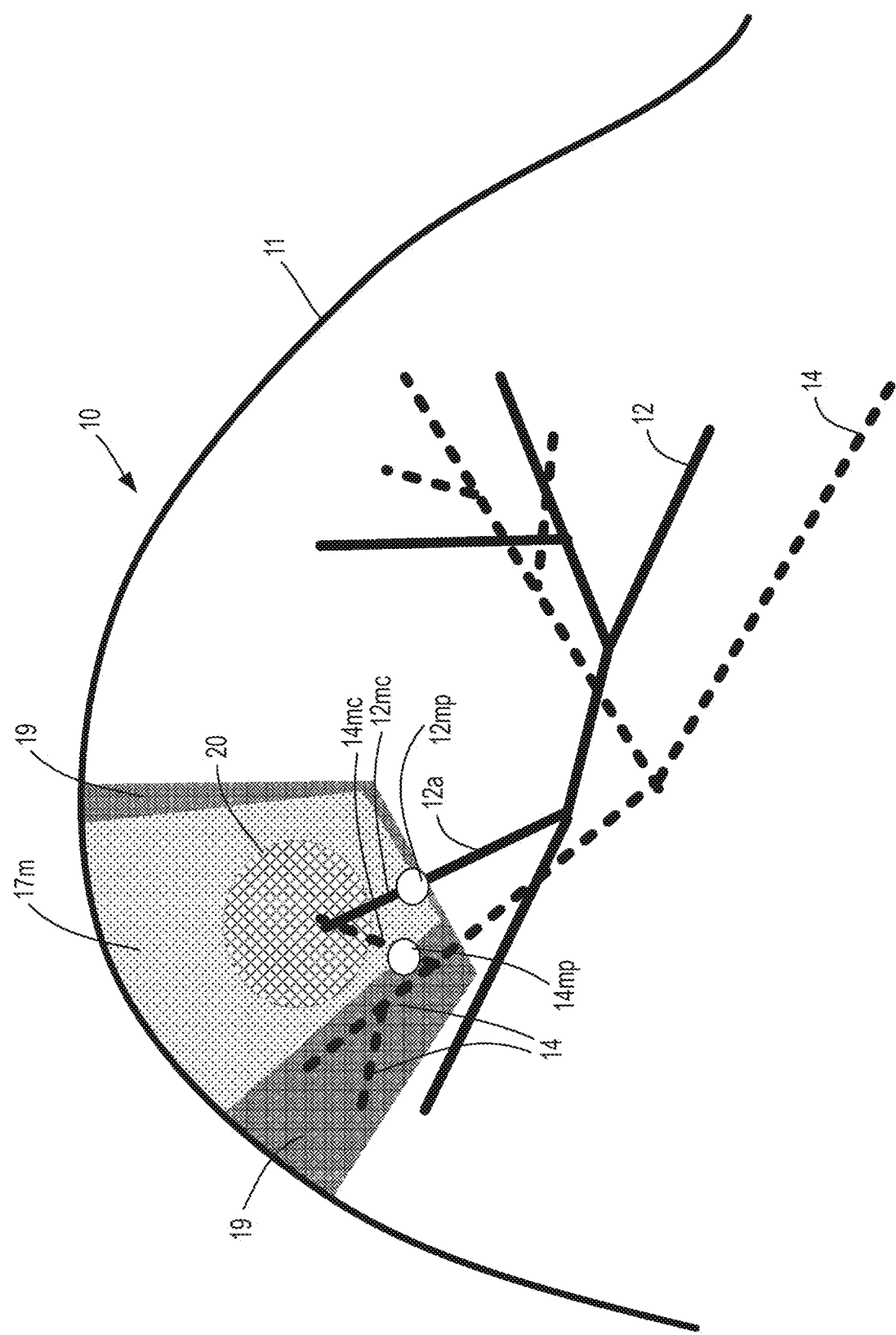
FIG. 8 is a diagram showing an example of a modified cutting position of the portal vein and the vein based on the modified resection region in the liver.

FIG. 8 is a diagram showing an example of modified cutting positions 12mp and 14mp of the portal vein 12 and the vein 14 based on the modified resection region 17m in the liver 10. The modified cutting position 12mp is a position where the cutting position 12p of the portal vein 12 (responsible blood vessel 12a) is modified by modifying the resection region 17 to form the modified resection region 17m. The modified cutting position 14mp is a position where the cutting position 14p of the vein 14 is modified by modifying the resection region 17 to derive the modified resection region 17m. The modified cutting positions 12mp and 14mp are shown, for example, in a two-dimensional cutting plane. The modified cutting position 12mp may be the intersection of the portal vein 12 (responsible blood vessel 12a) and an outer peripheral surface of the modified resection region 17m. The modified cutting position 14mp may be the intersection of the vein 14 and the outer peripheral surface of the modified resection region 17m.

Figure 9:
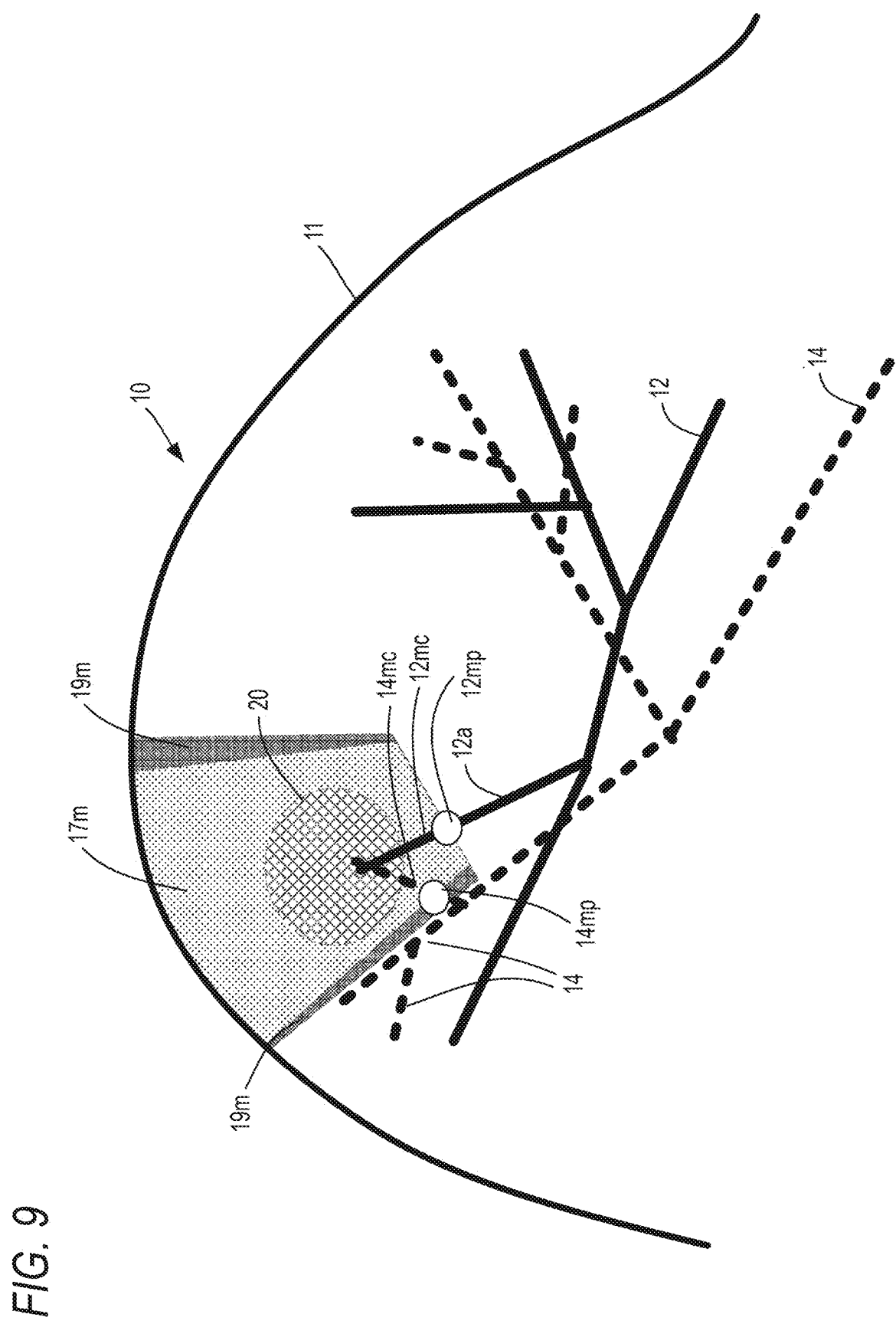
FIG. 9 is a diagram showing an example of a modified necrosis region based on the modified cutting position in the liver.

FIG. 9 is a diagram showing an example of a modified necrosis region 19m based on the modified cutting positions 12mp and 14mp of the portal vein 12 and the vein 14 in the liver 10. The modified necrosis region 19m is a region where the necrosis region 19 is modified by modifying the cutting positions 12p and 14p to derive the modified cutting positions 12mp and 14mp. The modified necrosis region 19m is a region including the territory of the portal vein 12 downstream of the modified cutting position 12mp and the perfusion region of the vein 14 downstream of the modified cutting position 14mp. FIG. 9 shows a modified portal vein removal portion 12mc removed by cutting the portal vein 12 at the modified cutting position 12mp and a modified vein removal portion 14mc removed by cutting the vein 14 at the modified cutting position 14mp. The modified portal vein removal portion 12mc and the modified vein removal portion 14mc are included in the modified necrosis region 19m. The modified resection region 17m is included in the modified necrosis region 19m.

The region processing unit 161 may manually or automatically generate the modified resection region 17m in the same manner as the designation of the resection region 17 shown in FIG. 4. The modified resection region 17m may be smaller than the resection region 17. As a result, a volume of the necrosis region 19 is reduced, and as such, the burden on the patient can be reduced. Here, the size of the volume of the necrosis region 19 of the liver 10 is inversely proportional to, for example, the good liver function. Further, the region processing unit 161 may generate the modified resection region 17m based on the volume of the necrosis region 19, for example, so that the volume of the necrosis region 19 or the ratio (volume ratio) of the necrosis region to a remaining region is equal to or less than a predetermined value. In this case, the processing unit 160 may repeatedly perform the generation of the modified resection region 17m, the generation of the modified necrosis region 19m, and the volume determination of the modified necrosis region 19m. Note that the remaining region is a region obtained by removing the resection region 17 from the liver 10, and is a region left as a part of the liver 10 by partial resection surgery or the like.

Figure 10:
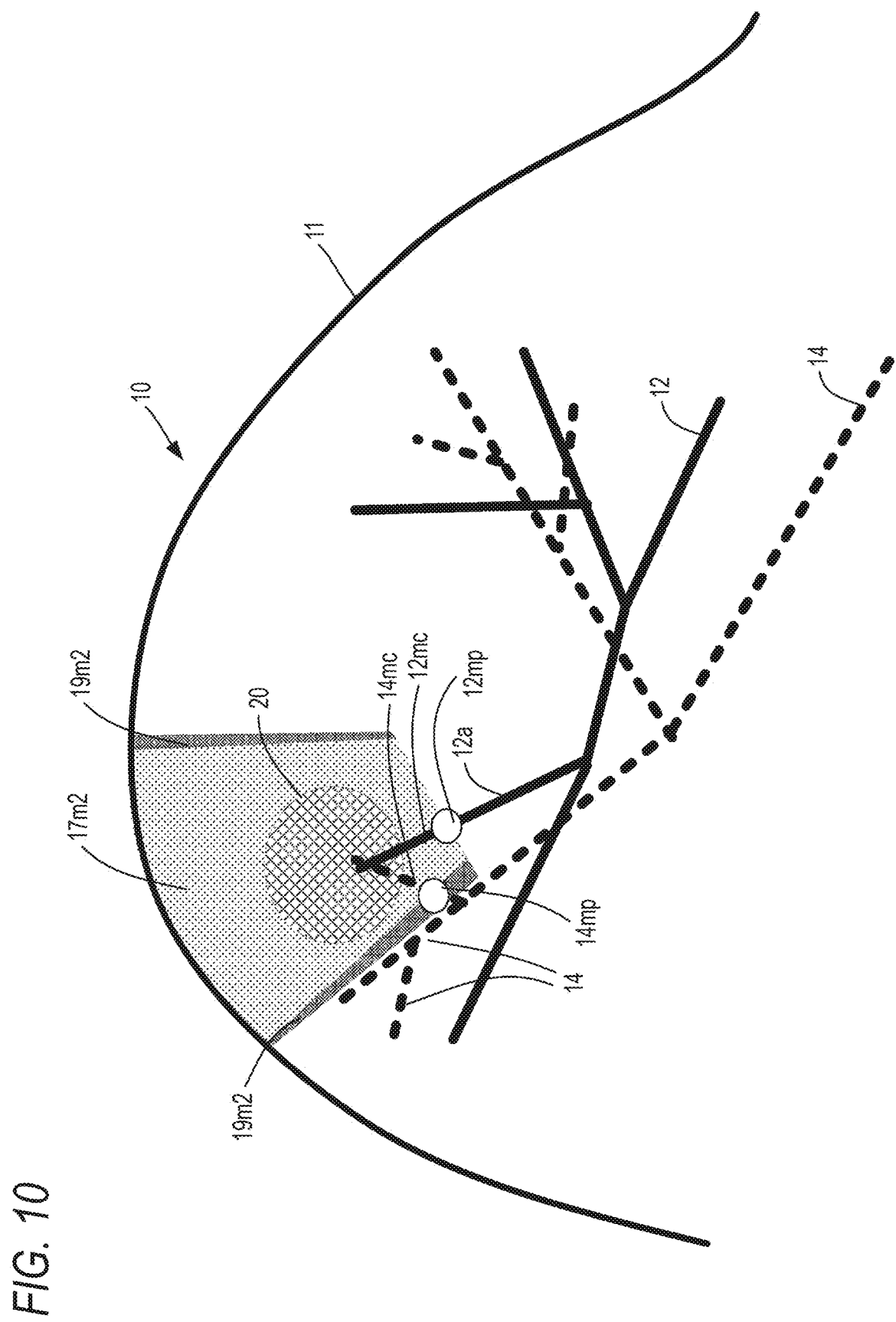
FIG. 10 is a diagram showing an example of a remodified resection region in the liver.

FIG. 10 is a diagram showing an example of a remodified resection region 17m2 in the liver 10. The region processing unit 161 modifies the modified resection region 17m to generate the remodified resection region 17m2. In FIG. 10, the modified resection region 17m is expanded to generate the remodified resection region 17m2 so that the necrosis region 19 does not expand. The region processing unit 161 may manually or automatically generate the remodified resection region 17m2 in the same manner as the designation of the resection region 17 shown in FIG. 4. The remodified resection region 17m2 may be smaller than the resection region 17 and greater than the modified resection region 17m. For example, the region processing unit 161 may generate the remodified resection region 17m2 by expanding the opening of the surface 11 of the liver 10 in the modified resection region 17m. Accordingly, it is possible to make it easier for the doctor to perform the procedure (for example, resection of region including tumor 20) while reducing the burden on the patient.

Figure 11:
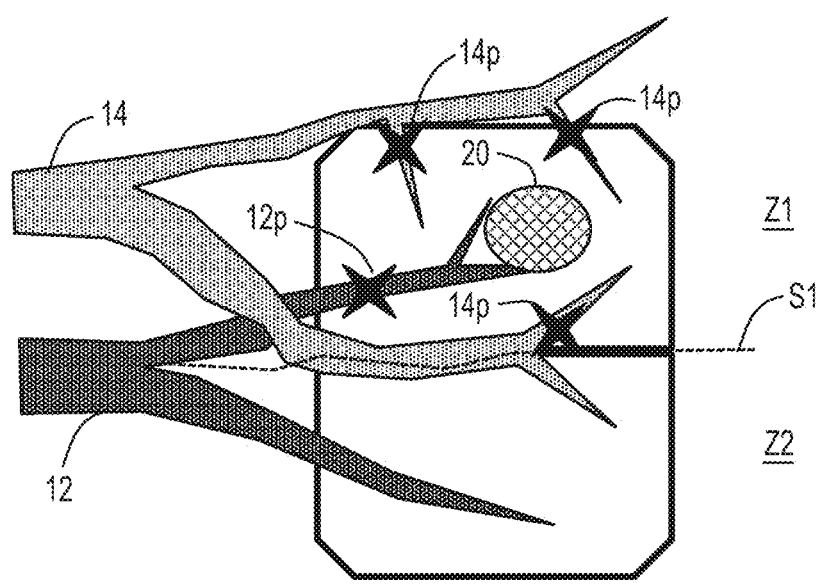
FIG. 11 is a diagram showing the cutting position of the portal vein and the vein.

FIG. 11 is a diagram showing the cutting positions 12p and 14p of the portal vein 12 and the vein 14. The portal vein 12 leads to the center of a predetermined segment (segment Z1 in FIG. 11) in the liver to nourish the tumor 20. Therefore, the cutting position processing unit 163 may determine the cutting position 12p so as to cut the portal vein 12 from the root thereof. On the other hand, the vein 14 runs around an end (near boundary) of the predetermined segment Z1 and a predetermined segment Z2 in the liver. Further, the tumor 20 having a lower stage (degree of progress in disease) is less likely to cross the boundary of the segment. Therefore, the cutting position processing unit 163 may determine the cutting position 14p so as to preserve the main pipe of the vein 14 and cut the branch pipe thereof entering the segment. The same is true for determining the modified cutting positions 12mp and 14mp. Therefore, the portal vein or the like and the vein are cut according to different criteria.

Figure 12:
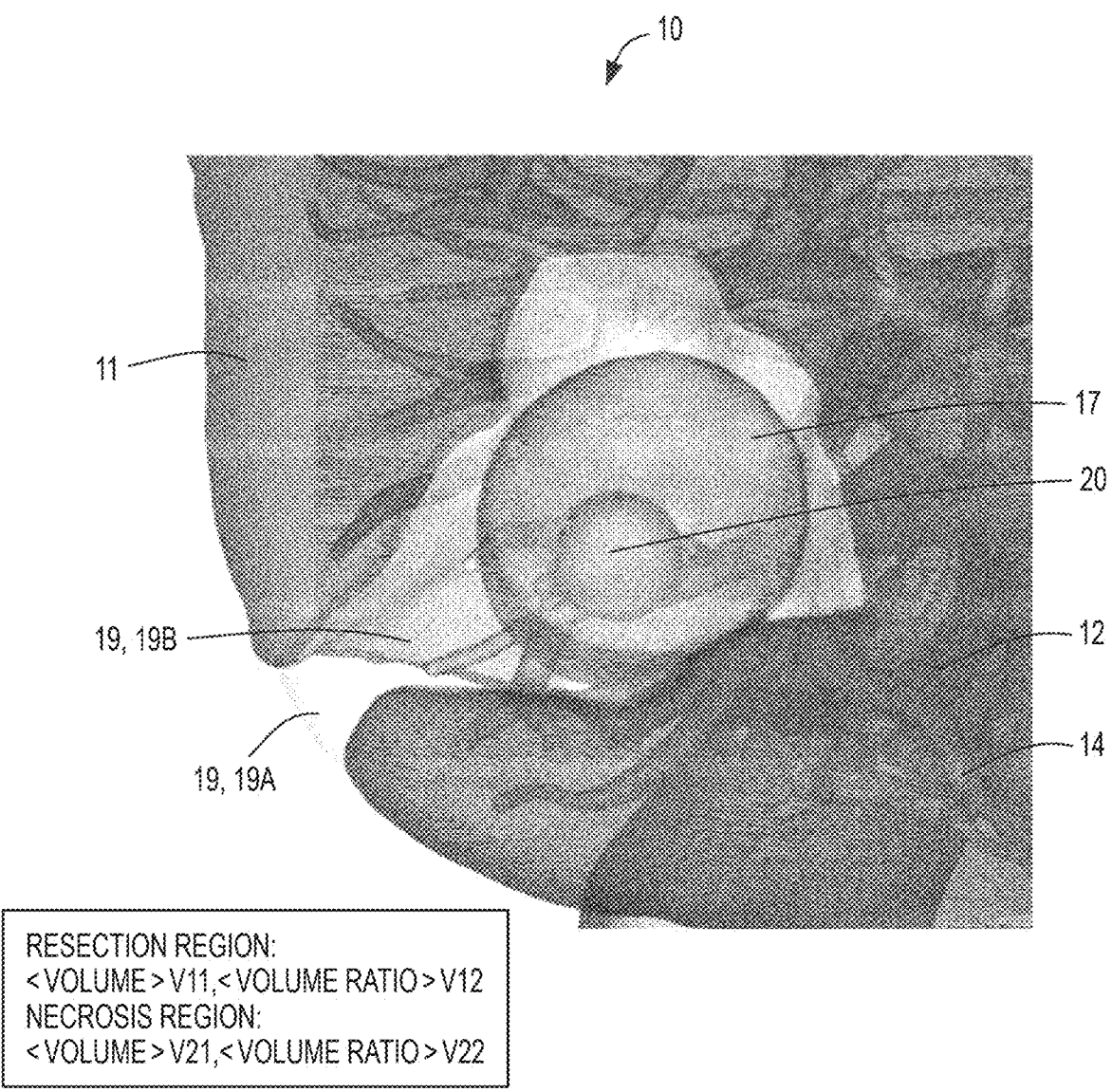
FIG. 12 is a view showing a display example of the resection region, the necrosis region, the tumor, the portal vein, and the vein of the liver.

FIG. 12 is a view showing a display example of the resection region 16, the necrosis region 19, the tumor 20, the portal vein 12, and the vein 14 of the liver 10. The image generation unit 162 may render at least a part of the resection region 17, the necrosis region 19, the remaining region, the artery, the portal vein 12, or the vein 14 included in the liver 10 to generate a rendering image. The display control unit 165 may display the rendering image. Further, additional information related to a rendering target may be displayed together.

In FIG. 12, in the liver 10, a region other than the necrosis region 19 is covered with the surface 11 of the liver 10. The display control unit 165 may display the resection region 17 and the necrosis region 19 in different display modes so that the same can be identified by a user. Furthermore, the display control unit 165 may display the resection region 17, the necrosis region 19, the tumor 20, the portal vein 12, and the vein 14 in different display modes so that the same can be respectively identified by the user.

In addition, in FIG. 12, the necrosis region 19 is displayed in a translucent form, and necrosis regions 19A and 19B are displayed as the necrosis region 19. The necrosis region 19A indicates that a non-necrotic portion of the liver 10 does not remain on the back side of the necrosis region 19A on the paper surface, that is, the necrosis region 19A penetrates the liver 10. The necrosis region 19B indicates that the non-necrotic portion of the liver 10 remains on the back side of the necrosis region 19B on the paper surface.

In addition, the display control unit 165 may display volume information related to the volumes of the whole liver, the resection region 17, the necrosis region 19, the remaining region, or the like. The volume information may include volumetric values of the whole liver, the resection region 17, the necrosis region 19, or the remaining region. The volume information may include the ratio of the resection region 17 to the whole liver (volume ratio of resection region 17), the ratio of the necrosis region 19 to the whole liver (volume ratio of necrosis region 19), or the ratio of the remaining region to the whole liver (volume ratio of remaining region). The volume information may include the volume ratios of any two of the resection region 17, the necrosis region 19, and the remaining region.

Here, the processing unit 160 can apply a technique described in Reference Patent Literature 3 (Reference Patent Literature 3: U.S. Pat. No. 10,249,074) for visualization (display) of a plurality of regions (for example, resection region 17, necrosis region 19, portal vein 12, and vein 14). In other words, even when a plurality of regions overlap with each other in the image displayed on a two-dimensional display surface, a user can distinguishably recognize the plurality of regions by coloring each region. Reference Patent Literature 3 is incorporated herein by reference in its entirety.

In addition, in the rendering performed by the image generation unit 162, the tumor 20, the resection region 17, the necrosis region 19, the remaining region, the portal vein 12, the vein 14, or the like may be respectively volume-rendered, may be surface-rendered, and may be a combination of both. The image generation unit 162 may generate images of various regions by generating masks from volume data, or may generate images of various regions by solids, surfaces, or the like. Further, the image generation unit 162 may generate a rendering image by combining surface rendering and volume rendering (refer to Reference Patent Literature 4 (Reference Patent Literature 4: Japanese patent application laid-open publication No. 2018-121857)). In addition, the image generation unit 162 may make the boundaries of the resection region 17, the necrosis region 19, or the remaining region translucent so that the running blood vessels inside the resection region 17, the necrosis region 19, or the remaining region can be confirmed through the boundaries. Additionally, the image generation unit 162 may draw only the shading of the boundaries of the resection region 17, the necrosis region 19, or the remaining region so that the running blood vessels inside the resection region 17, the necrosis region 19, or the remaining region can be confirmed (refer to Reference Patent Literature 5 (Reference Patent Literature 5: US Patent Application Publication No. 2017/0301129)). Reference Patent Literatures 4 and 5 are incorporated herein by reference in their entirety.

Next, an operation example of the medical image processing apparatus 100 will be described.

Figure 13:
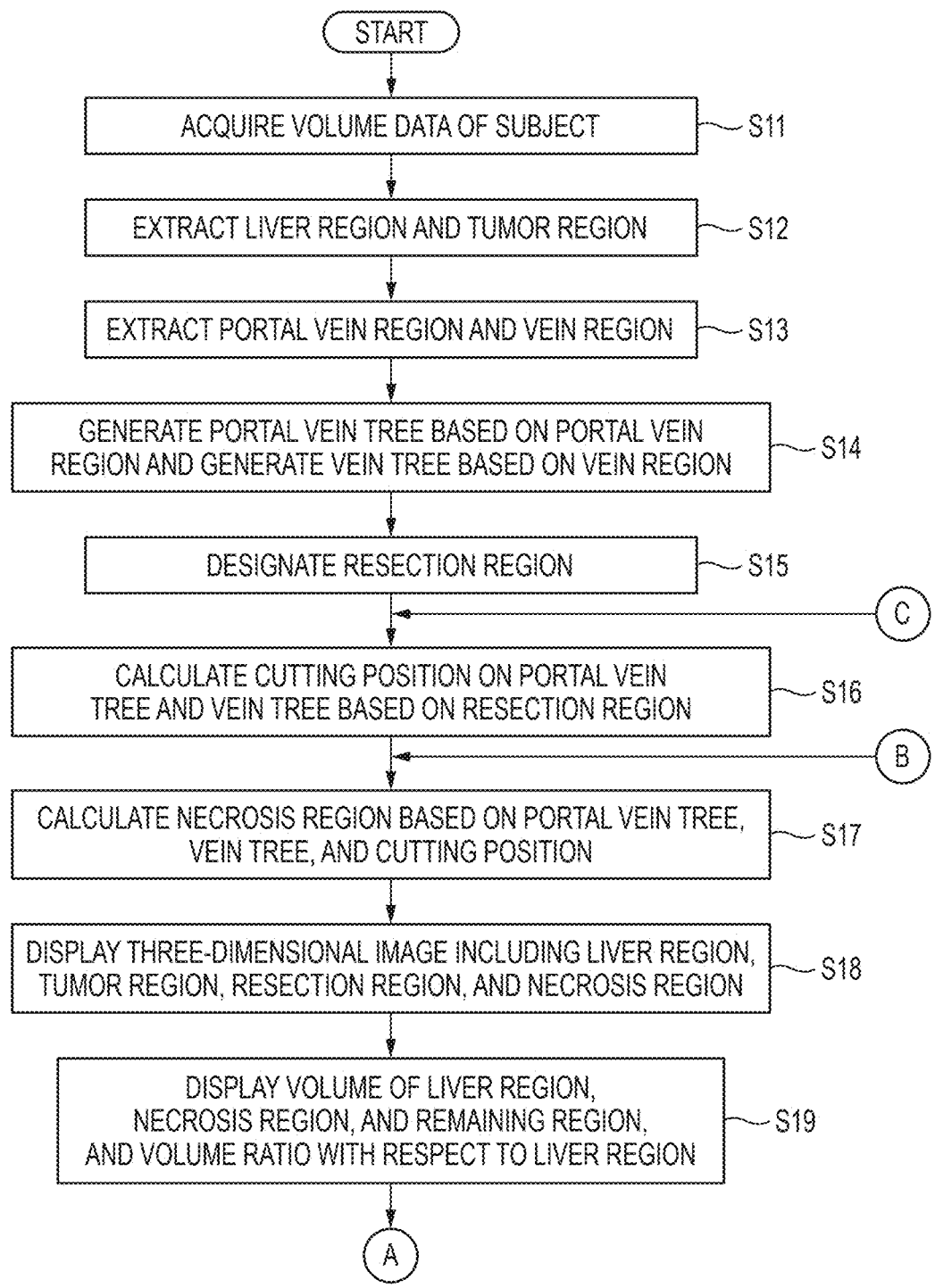
FIG. 13 is a flowchart showing an operation example of the medical image processing apparatus.
Figure 14:
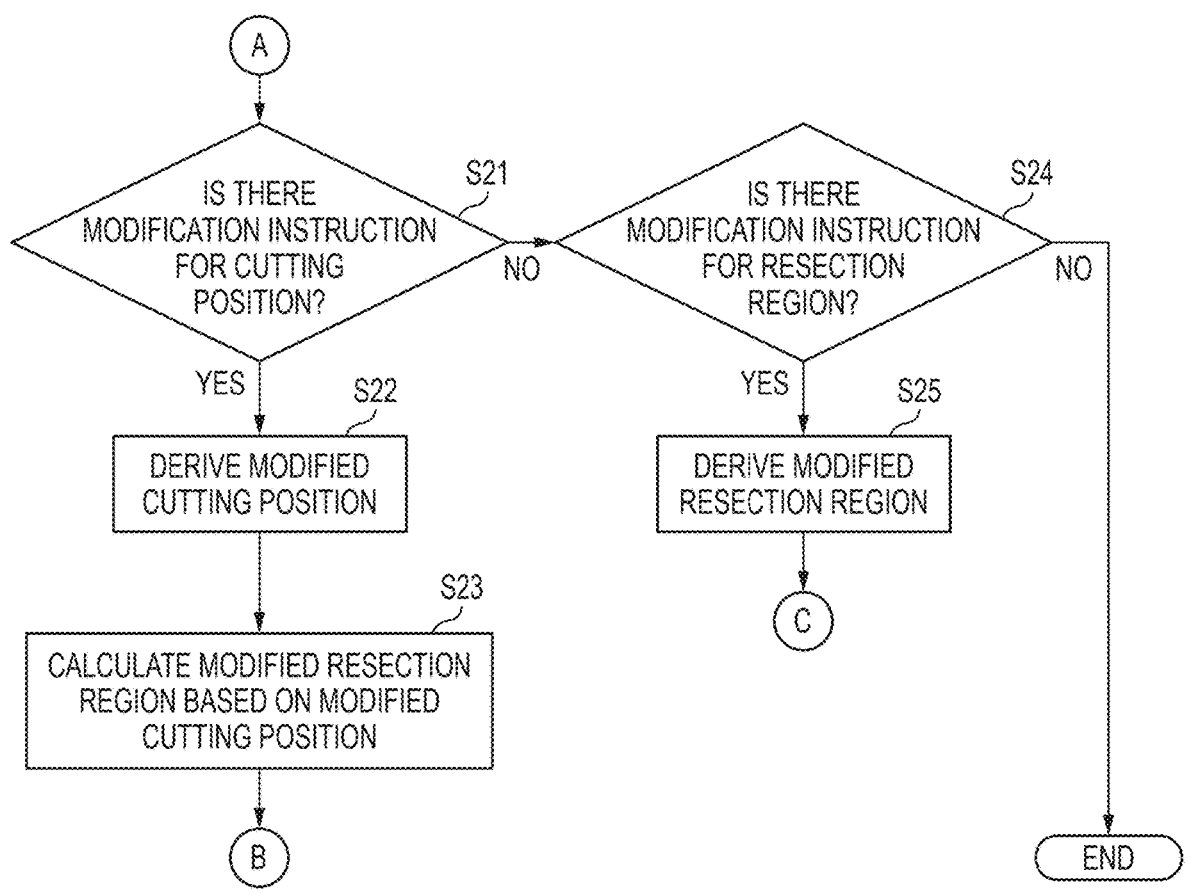
FIG. 14 is a flowchart showing the operation example of the medical image processing apparatus (continued from FIG. 13).

FIGS. 13 and 14 are flowcharts showing an operation example of the medical image processing apparatus 100. The processing in FIG. 13 is performed by each unit in the processing unit 160.

First, the port 110 acquires volume data of a subject (portal vein phase, vein phase) (S11). The region processing unit 161 extracts a liver region (liver 10) from the volume data and extracts a tumor region (tumor 20) (S12). The region processing unit 161 extracts a portal vein region (portal vein 12) from the volume data and extracts a vein region (vein 14) from the volume data (S13). The region processing unit 161 generates a portal vein tree based on the portal vein region and generates a vein tree based on the vein region (S14). The region processing unit 161 designates a resection region via the UI 120 (S15). The cutting position processing unit 163 calculates a cutting position on the portal vein tree based on the resection region and the portal vein tree, and calculates a cutting position on the vein tree based on the resection region and the vein tree (S16).

The region processing unit 161 calculates a necrosis region based on the portal vein tree, the vein tree, the cutting position on the portal vein tree, and the cutting position on the vein tree (S17). In this case, the territory of the portal vein may be calculated based on the portal vein tree and the cutting position thereof, the perfusion region of the vein may be calculated based on the vein tree and the cutting position thereof, and the necrosis region may be calculated based on the territory of the portal vein and the perfusion region of the vein.

The display control unit 165 causes the display 130 to display a rendering image including the liver region, the tumor region, the resection region, and the necrosis region (S18). The display control unit 165 may display the volumes of the liver region, the necrosis region, and the remaining region (S19). In addition, the display control unit 165 may display a volume ratio of the necrosis region to the liver region, a volume ratio of the remaining region to the liver region, and the like (S19).

After the processing of step S19, the processing proceeds to FIG. 14. The cutting position processing unit 163 determines whether there is a modification instruction for the cutting position of the portal vein or the cutting position of the vein (S21). For example, the modification instruction for the cutting position may be given based on the user's operation via the UI 120. When there is the modification instruction for any of the cutting positions (Yes in step S21), the cutting position processing unit 163 derives a modified cutting position 12mp2 of the portal vein or a modified cutting position 14mp2 of the vein based on the modification instruction (S22). The region processing unit 161 calculates a modified resection region 17m3 based on the derived modified cutting positions 12mp2 and 14mp2 (S23). After the processing of step S23, the processing proceeds to step S17 in FIG. 13, and the processing after step S17 is performed. For example, the region processing unit 161 calculates a modified necrosis region (modified necrosis region 19m2) based on the portal vein tree, the vein tree, the modified cutting position of the portal vein (modified cutting position of portal vein 12mp2), and the modified cutting position of the vein (modified cutting position of vein 14mp2) (S17).

When there is no modification instruction for any of the cutting positions in step S21, the region processing unit 161 determines whether there is a modification instruction for the resection region (S24). In this case, the modification instruction for the resection region may be given based on the user's operation via the UI 120. When there is the modification instruction for the resection region (Yes in step S24), the region processing unit 161 derives the modified resection region (modified resection region 17m) based on the modification instruction (S25). After the processing of step S25, the processing proceeds to step S16 in FIG. 13, and the processing after step S16 is performed. For example, the cutting position processing unit 163 calculates the modified cutting position of the portal vein (modified cutting position of portal vein 12mp) and the cutting position of the vein (modified cutting position of vein 14mp) based on the modified resection region 17m (S16).

Next, variations of the present embodiment will be described.

The resection region 17 may have a shape other than a conical trapezoidal shape. The region processing unit 161 may derive the resection region 17 by designating the resection region 17 in a primitive shape via the UI 120, and then finely modifying the shape thereof. Further, the region processing unit 161 may designate or modify the resection region 17 by designating the cutting position of the surface 11 of the liver 10 by two-dimensional operation via the UI 120. The region processing unit 161 may designate or modify the resection region 17 by designating the cutting position 12p or the cutting position 14p on the blood vessel (for example, portal vein 12 or vein 14) by one-dimensional operation via the UI 120. In this case, the user can easily designate or modify the resection region 17 on the three-dimensional image using a region image processing tool.

The tumor 20 may be visualized with a point without spreading the same on a two-dimensional plane or a three-dimensional space. A safe distance from the tumor 20 may be adjustable. The resection region 16 may be determined by considering the safe distance from the tumor 20. The tumor 20 may not be in an organ or may be a region of other diseases.

In addition, the region processing unit 161 may derive the territory of the portal vein or the like using the portal vein or the like without using the vein, or may derive the territory of the portal vein or the like by considering both the portal vein and the vein. In this case, the region processing unit 161 may calculate the portal vein tree and the vein tree separately, or may calculate the same based on a graph structure combining the portal vein tree and the vein tree. Further, after the territory is calculated, the display control unit 165 may display (for example, highlight) the contour of a portion obtained by combining the resection region 17 with the territory.

Further, the region processing unit 161 may designate a blood vessel to be preserved (not to be resected) via, for example, the UI 120. Additionally, the region processing unit 161 may recalculate the territory of the portal vein or the perfusion region of the vein based on the designation of the cutting positions (for example, cutting positions 12p and 14p) on the blood vessel. Further, the cutting position processing unit 163 may adjust the cutting position of the blood vessel by performing a drag operation on the three-dimensional image including the blood vessel displayed on the display 130 via, for example, the UI 120. In this case, the cutting position processing unit 163 may perform a control operation so that the cutting position moves on a blood vessel path. Accordingly, the user can easily operate the cutting position via the UI 120 on the three-dimensional image including the blood vessel displayed on the display 130. For example, when an excessively large resection region 17 is derived, the necrosis region 19 can be reduced by moving the cutting position 14p of the vein 14 to the downstream side of the vein 14 by a user operation. In addition, for example, when an excessively small resection region 17 is derived, the cutting position 14p of the vein 14 is moved to the upstream side of the vein 14 by a user operation. In this manner, the resection region 17 can be adjusted to be large to ensure that the tumor 20 is included in the resection region 17.

Although it is described as an example that the organ is the liver 10, other organs (for example, lungs or brain) may be used. The tubular tissue may include the portal vein of the liver 10, the arteries of the liver 10 or the lungs or kidneys, the veins 14 of the liver 10 or the lungs or kidneys, bronchi, lungs or cranial nerves. The cranial nerves may be extracted using tractography. Further, the image generating unit 162 may generate a three-dimensional image of an observation target by mixing volume rendering and surface rendering. The tubular tissue such as the blood vessel may include a tissue (for example, intestine) that does not have a tree. In this case, it is sufficient if the direction of flow in the tubular tissue can be identified. Further, the processing unit 160 may calculate a superior region using, as the tubular tissue, two or more tubular tissues having different developments, such as arteries and veins, bronchi and veins, bronchi and arteries and veins, nerve fibers and arteries, and fibers arteries and veins. In addition, when using two or more tubular tissues having different developments, the processing unit 160 may use different methods of setting cutting locations. This is because each property can be used.

Further, although the processing unit 160 obtains the necrosis region 19 of the liver 10 as an example, a failure region other than the necrosis region 19 may be derived. The failure region is a region where a tissue is predicted to be dysfunctional due to stagnation of circulation in the tubular tissue to be cut, that is, a region where the tissue is predicted to be dysfunctional. The failure region may include a region where the tissue is dysfunctional when airflow is cut off, such as the territory of bronchus, but does not become necrotic. In addition, the failure region may include, for example, a region where even though a blood vessel temporarily becomes dysfunctional due to ischemia, but a blood stream returns later or a blood vessel is rebuilt, and the tissue does not become necrotic.

In addition, the region processing unit 161 may modify the territory of the portal vein using the running of the vein. As a result, it is possible to improve the derivation accuracy of the territory of the portal vein. The resection region 17 does not necessarily have to be included in the necrosis region 19 and may not be included in the necrosis region 19.

According to the medical image processing apparatus 100 of the present embodiment, for example, when a user designates a position where the liver is roughly resected based on a primitive shape for the tumor 20 of the liver 10 in the subject, it is possible to derive how far the resection region 17 is to be. The medical image processing apparatus 100 can also estimate the necrosis region 19 when the vein 14 is resected, and considering not only the portal vein 12 but also cutting of the vein 14, it is possible to visualize the range in which the liver function may deteriorate. In addition, the medical image processing apparatus 100 can derive the resection region 17 based on the cutting position 12p by designating the cutting position 12p of one portal vein 12 via the UI 120. Further it is possible to derive, based on the resection region 17, the cutting positions 12p and 14p of other portal veins 12 and veins 14 passing through the resection region 17. Therefore, the user can confirm the influence caused by one cutting from various viewpoints.

Therefore, the user can confirm the surgery capable of being performed in such a manner that the portal vein 12 leading to the tumor 20 is largely removed and the vein 14 is not damaged as much as possible. Additionally, since the necrosis region 19 becomes large when the vein 14 is included in the resection region 17, for example, the necrosis region 19 can be reduced by adjusting the vein 14 to be outside the resection region 17 via the UI 120. In this case, it is possible to reduce the burden on the patient involved in surgery.

In addition, the medical image processing apparatus 100 can make a surgical planning (determine resection region) that is easy to be performed while preserving the liver function as much as possible, and for example, the resection region 17 and an approach direction for the resection can be determined. Further, the designation of the resection region 17 and the like included in the surgical planning may be performed using a primitive shape. In addition, the medical image processing apparatus 100 can display both a numerical value of the liver function (volume) affected by the surgical planning and an image of the liver 10, and present the numerical value and the image to the user. Modification of the resection region 17 in the surgical planning can also improve the influence on liver function (for example, necrosis). That is, after the user first designates any resection region 17, the resection region 17 can be modified (modified resection region 17m) in consideration of the necrosis region 19. The medical image processing apparatus 100 can also modify the resection region 17 (remodified resection region 17m2) so that the necrosis region 19 does not change, for example, so that the organ surface side is widened so that the organ can be more easily approached. As a result, the medical image processing apparatus 100 can make a surgery planning that is easier to be performed by suppressing the influence on the liver function.

When the vein 14 located at the boundary of the resection region 17 is resected, blood may stagnate in the combined remaining region outside the resection region 17 and a tissue in a part of the region (necrosis region 19) of the remaining region may not function. On the other hand, the medical image processing apparatus 100 can assist adjustment of the size of the resection region 17 by visualizing the necrosis region 19. Further, the size of the resection region 17 can be optimized by repeating derivation of the resection region 17, derivation of the cutting positions 12p and 14p, and derivation of the necrosis region 19. Therefore, the medical image processing apparatus 100 includes the entire tumor 20 and reduces the resection region 17 as small as possible, and as such, the burden on the patient can be reduced while the disease is sufficiently resected.

Although various embodiments have been described above with reference to the drawings, it goes without saying that the present disclosure is not limited to the embodiments. It is clear that those skilled in the art can come up with various modifications or corrections within the scope of the claims, and it is understood that those modifications or corrections also belong to the technical scope of the present disclosure.

Further, the medical image processing apparatus 100 may include at least the processor 140 and the memory 150. The port 110, the UI 120, and the display 130 may be external to the medical image processing apparatus 100.

Additionally, it is described as an example that the volume data as the acquired CT image is transmitted from the CT scanner 200 to the medical image processing apparatus 100. Alternatively, the volume data may be transmitted to a server on the network (for example, image data server (PACS) (not shown)) or the like and stored so as to be temporarily stored therein. In this case, when necessary, the port 110 of the medical image processing apparatus 100 may acquire the volume data from the server or the like via a wired line or wireless line, or via any storage medium (not shown).

It is described as an example that the volume data as the acquired CT image is transmitted from the CT scanner 200 to the medical image processing apparatus 100 via the port 110. This example includes a case in which the CT scanner 200 and the medical image processing apparatus 100 are substantially integrated into one product. This example also includes a case in which the medical image processing apparatus 100 is treated as a console of the CT scanner 200.

In addition, although it is described as an example that the CT scanner 200 acquires an image and generates volume data including information on the inside of the subject, an image may be acquired by other devices to generate volume data. Other devices include a magnetic resonance imaging (MRI) device, a positron emission tomography (PET) device, an angiography device, or other modality devices. Further, the PET device may be used in combination with other modality devices.

Additionally, the present embodiment can be described as a medical image processing method in which the operation in the medical image processing apparatus 100 is defined. Furthermore, the present embodiment can be described as a program configured to cause a computer to execute each step of the medical image processing method.

Outline of the Above Embodiment

One aspect of the above embodiment is the medical image processing apparatus 100 configured to visualize an organ (for example, liver 10). Here, the medical image processing apparatus 100 includes the processing unit 160. The processing unit 160 acquires volume data including the organ and designates a tubular tissue included in the organ. Here, the processing unit 160 may designate the resection region 17 (example of first resection region) that includes the tubular tissue and is a region to be resected in the organ. The processing unit 160 may derive, based on the designated resection region 17, the cutting positions 12*p* and 14*p* (example of first cutting position) where the tubular tissue is cut. The processing unit 160 may derive, based on the tubular tissue and the cutting positions 12*p* and 14*p*, the necrosis region 19 that is included in the organ and is predicted to cause necrosis of the tissue due to stagnation of circulation in the tubular tissue to be cut (example of first failure region where tissue is predicted to be dysfunctional). The processing unit 160 causes the display 130 (example of display unit) to display the organ, the resection region 17, and the necrosis region 19.

As a result, the medical image processing apparatus 100 can visualize the necrosis region 19 resulting from partial resection of the organ. Therefore, the user can visually recognize the necrosis region 19 together with the resection region 17, thereby making it possible to reliably make a surgical planning. For example, in the case of the surgical planning, the user can make the surgical planning so that the resection region 17 is determined as large as possible and the necrosis region 19 is determined as small as possible. In addition, the processing unit 160 may derive the modified resection region 17*m* (example of second resection region) including the tubular tissue by changing the resection region 17, and may derive, based on the modified resection region 17*m*, the modified cutting positions 12*mp* and 14*mp* (example of second cutting position) where the tubular tissue is cut. The processing unit 160 may derive, based on the tubular tissue and the modified cutting positions 12*mp* and 14*mp*, a modified necrosis region (example of second failure region) included in the organ, and may cause the display 130 to display the organ, the modified resection region 17*m*, and the modified necrosis region 19*m*.

Accordingly, the medical image processing apparatus 100 can adjust the range of the necrosis region 19 by adjusting the resection region 17. Therefore, for example, when the necrosis region 19 is large and is considered to impose a heavy burden on the patient, the user can reduce the necrosis region 19 by reducing the resection region 17. The medical image processing apparatus 100 can also perform adjustment to ensure that a disease such as the tumor 20 is included in the resection region 17. Therefore, the medical image processing apparatus 100 can make a surgical planning that reduces the burden on the patient while preserving the functions of organs as much as possible.

Further, the size of the modified necrosis region 19*m* may be equal to or smaller than the size of the necrosis region 19, and as such, the burden on the patient can be reduced. The size of the modified resection region 17*m* may be equal to or greater than the size of the resection region 17. As a result, the user can perform surgery easily by performing rough procedures, and can maximumly remove a disease.

Additionally, the processing unit 160 may generate, based on the modified necrosis region 19*m*, the remodified resection region 17*m*2 (example of third resection region) that is greater than the modified resection region 17*m* and smaller than the modified necrosis region 19*m*. Accordingly, in the case of the medical image processing apparatus 100, in the range in which the size of the modified necrosis region 19*m* is not changed, the user can easily perform the surgery by performing rough procedures, and it is possible to automatically generate the remodified resection region 17*m*2 in which a disease can be maximumly removed.

In addition, the processing unit 160 may designate the modified cutting positions 12*mp*2 and 14*mp*2 (example of third cutting position) by changing the cutting positions 12*p* and 14*p*, may derive the modified resection region 17*m*3 (example of fourth resection region) and the modified necrosis region 19*m*2 (example of third failure region) included in the organ based on the tubular tissue and the modified cutting positions 12*mp*2 and 14*mp*2, and may cause the display 130 to display the organ, the modified resection region 17*m*3, and the modified necrosis region 19*m*2.

As a result, the medical image processing apparatus 100 can adjust the third resection region and the third failure region based on the modified cutting position by modifying the cutting position on the tubular tissue. For example, the medical image processing apparatus 100 can provide the user with information on how much the resection region 17 and necrosis region 19 are affected when the cutting position is changed to preserve a blood vessel at any position.

Furthermore, the organ may be the liver 10. The tubular tissue may include at least two of arteries, portal veins, and veins. As a result, the medical image processing apparatus 100 can derive the necrosis region 19 in consideration of the respective territories of a plurality of tubular tissues. For example, the necrosis region 19 is derived and displayed in consideration of the vein 14, and the user can easily determine whether the cutting position 14*p* is to be modified on the vein 14 and whether to exclude the vein 14 from the resection region 17.

The present disclosure is useful for a medical image processing apparatus, a medical image processing method, a medical image processing program, and the like capable of visualizing a failure region due to partial resection of an organ.

The invention claimed is:

1. A CT, MRI or X-ray image processing apparatus comprising:
 a processor and configured to visualize an organ, the processor being configured to:
 acquire volume data including the organ;
 designate a tubular tissue included in the organ;
 designate a first resection region including the tubular tissue, the first resection region being a resection target region in the organ;
 derive, based on the designated first resection region, a first cutting position at which the tubular tissue is cut;
 designate a third cutting position by changing the first cutting position;
 derive, based on the tubular tissue and the first cutting position, a first failure region included in the organ, the first failure region being predicted to cause a tissue to be dysfunctional due to stagnation of circulation in the tubular tissue to be cut;
 derive, based on the tubular tissue and the third cutting position, a fourth resection region and a third failure region included in the organ; and
 cause a display to display the organ, the first resection region, the fourth resection region, the first failure region, and the third failure region,
 wherein the tubular tissue includes at least two different tubular tissues of different developments.

2. The CT, MRI or X-ray image processing apparatus according to claim 1, wherein the processor is configured to:
 derive a second resection region including the tubular tissue by changing the first resection region;
 derive, based on the second resection region, a second cutting position at which the tubular tissue is cut;
 derive a second failure region included in the organ based on the tubular tissue and the second cutting position; and
 cause the display to display the organ, the second resection region, and the second failure region.

3. The CT, MRI or X-ray image processing apparatus according to claim 2, wherein size of the second failure region is equal to or less than size of the first failure region.

4. The CT, MRI or X-ray image processing apparatus according to claim 2, wherein size of the second resection region is equal to or greater than size of the first resection region.

5. The CT, MRI or X-ray image processing apparatus according to claim 2, wherein the processor generates, based on the second failure region, a third resection region greater than the second resection region and smaller than the second failure region.

6. The CT, MRI or X-ray image processing apparatus according to claim 1, wherein one of the two different tubular tissues is a vein.

7. The CT, MRI or X-ray image processing apparatus according to claim 6, wherein
 the organ is liver, and
 the tubular tissue includes an artery or a portal vein and the vein.

8. A CT, MRI or X-ray image processing method for visualizing an organ, the CT, MRI or X-ray image processing method comprising:
 acquiring volume data including the organ;
 designating a tubular tissue included in the organ;
 designating a first resection region including the tubular tissue, the first resection region being a resection target region in the organ;
 deriving, based on the designated first resection region, a first cutting position at which the tubular tissue is cut;
 designating a third cutting position by changing the first cutting position;
 deriving, based on the tubular tissue and the first cutting position, a first failure region included in the organ, the first failure region being predicted to cause the tissue to be dysfunctional due to stagnation of circulation in the tubular tissue to be cut;
 deriving, based on the tubular tissue and the third cutting position, a fourth resection region and a third failure region included in the organ; and
 displaying, by a display, the organ, the first resection region, the fourth resection region, the first failure region, and the third failure region,
 wherein the tubular tissue includes at least two different tubular tissues of different developments.

9. A non-transitory computer-readable recording medium storing a CT, MRI or X-ray image processing program for causing a computer to execute the processing method according to claim 8.

* * * * *